United States Patent
Bidinger

(10) Patent No.: US 12,449,393 B2
(45) Date of Patent: Oct. 21, 2025

(54) TRANSISTOR-BASED BIOSENSOR

(71) Applicant: Bainbridge Bio, Inc., Bainbridge Island, WA (US)

(72) Inventor: Sophia Bidinger, Cambridge (GB)

(73) Assignee: BAINBRIDGE BIO, INC., Bainbridge Island, WA (US)

( * ) Notice: Subject to any disclaimer, the term of this patent is extended or adjusted under 35 U.S.C. 154(b) by 381 days.

(21) Appl. No.: 18/097,369

(22) Filed: Jan. 16, 2023

(65) Prior Publication Data

US 2024/0241073 A1 Jul. 18, 2024

(51) Int. Cl.
  G01N 27/327 (2006.01)
  G01N 27/414 (2006.01)

(52) U.S. Cl.
  CPC ..... *G01N 27/3277* (2013.01); *G01N 27/4145* (2013.01)

(58) Field of Classification Search
  None
  See application file for complete search history.

(56) References Cited

U.S. PATENT DOCUMENTS

| | | |
|---|---|---|
| 9,530,976 B2 | 12/2016 | Ferro et al. |
| 11,307,162 B2 | 4/2022 | Yan et al. |
| 2007/0020641 A1 | 1/2007 | Heeger et al. |
| 2021/0196161 A1 | 7/2021 | Plaxco et al. |

FOREIGN PATENT DOCUMENTS

WO  WO-2018207220 A1 * 11/2018 ......... G01N 27/4146

OTHER PUBLICATIONS

N. Saraf, et al., "Highly selective aptamer based organic electrochemical biosensor with pico-level detection", Biosensor and Bioelectronics, 117: p. 40-46, Oct. 2018.*
I. Gualandi, et al., "All poly(3,4-ethylenedioxythiophene) organic electrochemical transistor to amplify amperometric signals", Electrochimica Acta, 268: p. 476-483, Apr. 2018.*
Bidinger, S. et al., "Highly stable PEDOT:PSS electrochemical transistors", article in Applied Physics Letters, 120, 073302 (2022), published online Feb. 16, 2022, pp. 073302-1-073302-5, obtained from Internet: https://aip.scitation.org/doi/10.1063/5.0079011.
Liang, Y. et al., "Amplification of aptamer sensor signals by four orders of magnitude via interdigitated organic electrochemical transistors", Biosensors and Bioelectronics journal publication, vol. 144, Nov. 1, 2019, 111668, Elsevier.

(Continued)

*Primary Examiner* — J. Christopher Ball
(74) *Attorney, Agent, or Firm* — COATS & BENNETT, PLLC

(57) ABSTRACT

Broadly speaking, embodiments of the present techniques generally provide biosensors for detecting target small molecules in a fluid sample. In particular, the present techniques provide a biosensor comprising an organic electrochemical transistor, OECT and a monolayer of aptamers designed to bind to a target small molecule. The biosensor may be of a size to make it suitable for wearing on or implanting in a human or animal body.

16 Claims, 7 Drawing Sheets

(56) References Cited

OTHER PUBLICATIONS

Ji, X. et al., "Organic electrochemical transistor as an on-site signal amplifier for electrochemical aptamer-based sensing", Manuscript, preprint posted Jul. 19, 2022, pp. 1-14, Department of Biomedical Engineering, Northwestern University, Evanston, IL, US.

Bidinger, S. et al., "Pulsed transistor operation enables miniaturization of electrochemical aptamer-based sensors", Manuscript, preprint posted Jun. 11, 2022, pp. 1-9, Department of Engineering, University of Cambridge, UK & Department of Chemistry and Biochemistry and Center for Bioengineering, University of California Santa Barbara, Santa Barbara, CA, US.

Bidinger, S. et al., "Pulsed transistor operation enables miniaturization of electrochemical aptamer-based sensors", Sci. Adv. 8, eadd4111 (2022), Nov. 16, 2022, pp. 1-5, Obtained from internet Jan. 10, 2023, obtained from: https://www.science.org, Cambridge University.

* cited by examiner

TRANSISTOR-BASED BIOSENSOR

FIELD

The present techniques generally relate to sensors for detecting target small molecules in a fluid sample. In particular, the present techniques provide a biosensor comprising an organic electrochemical transistor, OECT and a monolayer of aptamers on the gate electrode designed to bind to a target small molecule. The biosensor may be of a size to make it suitable for wearing on or implanting in a human or animal body.

BACKGROUND

The development of electrochemical aptamer-based (E-AB) sensors has been a promising step towards continuous small molecule biosensing. These sensors can be implanted to measure a wide variety of analytes in-vivo, ranging from drugs to metabolites to hormones. Continuous monitoring of these drugs or biomarkers will provide transformative data to patients and healthcare providers. For example, current therapeutic drug monitoring protocols rely on blood draws, which are expensive, time consuming, and provide very poor temporal resolution. E-AB sensors are an excellent candidate for this type of medical application due to their ability to sense continuously, reversibly, and without dependence on the intrinsic electrochemical activity of the analyte. The ability to select new aptamers endows E-AB sensors with unmatched modularity that cannot be achieved with antibody or enzyme-based sensors.

Despite the benefits of existing E-AB sensors, there are major challenges in optimizing for implantable biosensing. Namely, miniaturization is limited by small signals due to the limited current from the aptamers. Smaller sensors with less area can fit fewer aptamers, so current E-AB configurations must rely on relatively large and bulky electrodes. An additional challenge with current E-AB sensors is that they rely on a reference electrode. Common materials used as pseudo-references in-vivo are suboptimal with any prolonged sensing application as leakage of ions will cause potential shift and is likely toxic to the surrounding tissue. Inclusion of a reference electrode also increases size requirements of the sensor and adds fabrication complexity.

The applicant has therefore identified the need for an improved sensor for detecting target small molecules, particularly in a biological context.

SUMMARY

In a first approach of the present techniques, there is provided a biosensor for small molecule detection in a fluid, the biosensor comprising: a reference-less organic electrochemical transistor, OECT, comprising a gate electrode and a channel; a monolayer of aptamers, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule; and electronic circuitry for: applying a voltage pulse to the gate electrode and applying a voltage across the channel, and measuring a current through the channel to determine a proportion of the aptamers that are bound to target small molecules.

Advantageously, the biosensor of the present techniques makes use of an organic electrochemical transistor, OECT, which is able to simultaneously transduce and amplify electrochemical signals. This amplification is scalable in proportion to the dimensions of the channel of an OECT, such that shrinking the biosensor yields more amplification and therefore output signals from the sensor are not diminished with miniaturization. OECTs can be microfabricated with all biocompatible materials on thin and flexible substrates, making them less invasive than existing E-ABs for implantable bioelectronics.

The term "aptamer" is used herein to mean a short sequence of DNA, RNA, XNA or peptide that binds a specific target molecule or family of target molecules.

The term "monolayer" is used herein to mean a single, closely packed layer of atoms, molecules or cells. In the present techniques, the monolayer comprises a plurality of aptamers. The aptamers forming the monolayer may all be the same type, such that they all bind to the same target small molecule or the same family of target small molecules.

The term "small molecule" is used herein to mean a low molecular weight organic compound which may be involved in or regulate a biological process. A small molecule may have a mass range of between 50-1500 Daltons.

The binding of target molecule to the aptamer may cause a change in electron transfer rate to or from the gate electrode. The whole aptamer binds to the target molecule. As a result of the binding, the structure of the aptamer may change. In particular, the binding may cause the aptamer to fold in such a way that the second end of the aptamer is brought into closer proximity to the gate electrode. Thus, the redox reporter molecule on the second end of the aptamer is brought into closer proximity to the gate electrode, which causes the electrochemical signal to change. In some cases, when an aptamer is not bound to a target small molecule, the second end of the aptamer may be further away from the gate electrode than when the aptamer is bound to a target small molecule. In such cases, when the aptamer is not bound to a target small molecule, electron transfer may still occur between the redox reporter molecule and the gate electrode, but the rate of electron transfer is lower than when the redox reporter molecule is in closer proximity to the gate electrode (as a result of the binding of the aptamer to a target small molecule). In other cases, when an aptamer is not bound to a target small molecule, the second end of the aptamer may be closer to the gate electrode than when the aptamer is bound to a target small molecule. In such cases, when the aptamer is bound to a target small molecule, electron transfer may still occur between the redox reporter molecule and the gate electrode, but the rate of electron transfer is lower than when the redox reporter molecule is in closer proximity to the gate electrode (as a result of the aptamer not being bound to a target small molecule). Thus, depending on the aptamer, the binding of the target small molecule causes the electrochemical signal to change, i.e. to increase or decrease.

As mentioned above, the electronic circuit of the biosensor applies a voltage pulse to the gate electrode. The voltage pulse may be applied using any suitable technique. For example, an alternating voltage may be applied to the gate electrode.

A frequency of the voltage pulse applied to the gate electrode may be tuned to an electron transfer rate of the redox reporter molecule when an aptamer is bound to a target small molecule. This enables the proportion of aptamers bound to target small molecules to be determined.

A current through the channel of the OECT may be measured at the end of each voltage pulse to determine a proportion of the aptamers that are bound to target small molecules. As noted above, a voltage may be applied to the channel continuously, but the resulting current through the channel may only be measured at the end of each pulse so that the changes in current that arise due to the change in electron transfer are measured. This enables the proportion of aptamers bound to target small molecules to be determined.

The OECT may amplify the current through the channel amperometrically by modulating a source-drain current through a Faradaic current at the gate electrode. The term "amperometrically" is used herein to mean that current-current gain is measured, which results due to the change in electron transfer rate. In contrast, existing reference-based sensors are based on voltage-current gain.

The fluid may function as an electrolyte, and the current through the gate electrode may drive ions from the electrolyte into and out of the channel of the transistor.

Geometries of the gate electrode and channel may be balanced to drive a redox reaction between the redox reporter molecule and the gate electrode, to enable measurement of the change in electron transfer rate and to drive ions from the electrolyte into and out of the channel. The geometries of the gate electrode and channel may be balanced to match capacitance, such that voltage drops over both the gate and channel drive the redox reaction.

The gate electrode may comprise a metal. The metal may be gold. The gate electrode may comprise multiple metals. For example, the gate electrode may be formed of a gold layer and an adhesion layer formed of, for example, titanium.

The channel may be formed of an organic mixed ionic-electronic conductor. The organic mixed ionic-electronic conductor may be PEDOT:PSS, i.e. poly(3,4-ethylenedioxythiophene) blended with polystyrene sulfonate.

The biosensor may further comprise a flexible substrate. The OECT and monolayer of aptamers may be provided on the flexible substrate. The flexible substrate may be formed of a polymer material.

In some cases, the biosensor may be wearable or implantable, such that it is able to detect, in use, the target small molecules within a bodily fluid in a user. In other cases, the biosensor may be provided as or within an apparatus for receiving fluid samples. In any case, the biosensor may provide real-time monitoring of the target small molecule.

The biosensor may further comprise a housing for housing the OECT, the monolayer of aptamers, and the electronic circuitry. The housing may comprise a mechanism for receiving a fluid on the monolayer of aptamers.

The mechanism may be an opening or aperture in the housing for receiving a fluid on the monolayer of the biosensor.

The biosensor may be wearable or implantable, in which case, in use, the opening may be in contact with a bodily fluid of a user. Alternatively, the biosensor may be an in vitro apparatus for receiving fluid samples taken from a human or animal.

The biosensor may comprise a transmitter for transmitting a value of the measured current to an external device. The transmitter may use a wireless or wired communication mechanism. The wireless communication mechanism may be Bluetooth or Bluetooth Low Energy, for example.

In a second approach of the present techniques, there is a method for detecting target small molecules in a fluid, the method comprising: providing a volume of fluid on a biosensor comprising a reference-less organic electrochemical transistor, OECT, comprising a gate electrode and a channel, and a monolayer of aptamers, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule; applying a voltage pulse to the gate electrode of the OECT and applying a voltage across the channel; and measuring a current through the gate electrode at the end of the voltage pulse to determine a proportion of the aptamers that are bound to target small molecules.

Applying a voltage pulse may comprise applying a voltage pulse having a frequency that is tuned to an electron transfer rate of the redox reporter molecule when an aptamer is bound to a target small molecule. The method may further comprise: transmitting a value of the measured current to an external device.

BRIEF DESCRIPTION OF THE DRAWINGS

Implementations of the present techniques will now be described, by way of example only, with reference to the accompanying drawings, in which.

DETAILED DESCRIPTION OF THE DRAWINGS

Figure 1:
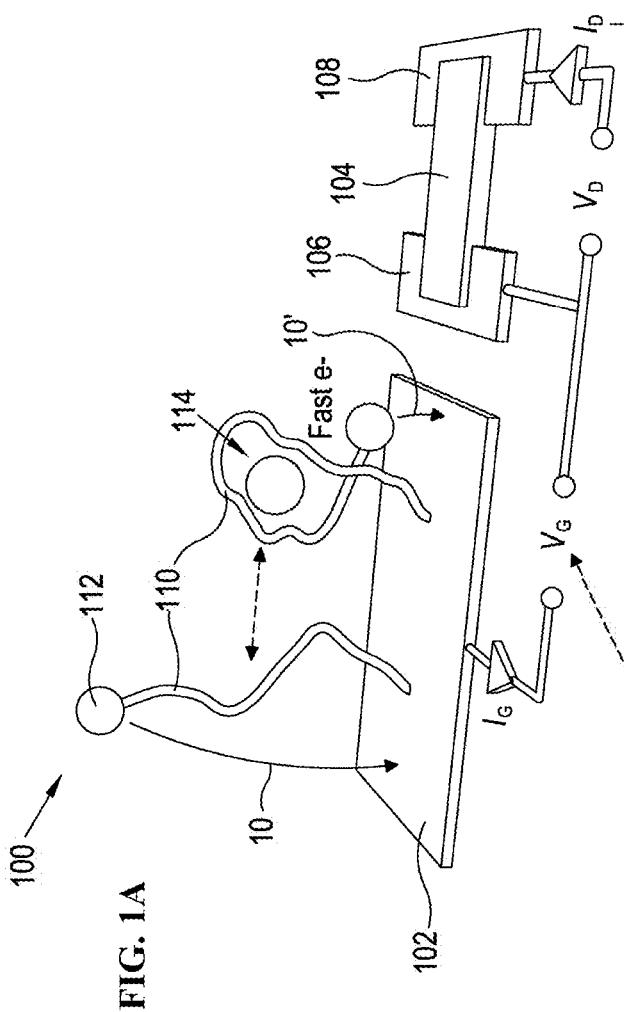
FIG. 1A is a schematic diagram illustrating the biosensor of the present techniques.
FIGS. 1B to 1E are graphs showing the operation of the biosensor.

Broadly speaking, embodiments of the present techniques generally provide biosensors for detecting target small molecules in a fluid sample. In particular, the present techniques provide a biosensor comprising an organic electrochemical transistor, OECT and a monolayer of aptamers designed to bind to a target small molecule. The biosensor may be of a size to make it suitable for wearing on or implanting in a human or animal body.

To address the challenge of signal amplification in electrochemical biosensors, there has been a trend towards transistor-based platforms that both transduce and amplify electrochemical signals. Among these, organic electrochemical transistors (OECTs) have emerged as a particularly high-performance candidate due to the large signal gain associated with volumetric ion penetration throughout a conducting polymer channel, commonly composed of the commercially available blend (poly(3,4ethylenedioxythiophene) doped with poly(styrene sulfonate) (PEDOT:PSS). By amplifying directly at the sensing location, these systems have been shown to afford better signal-to-noise ratios than simple electrode-based approaches when used, for example, in neural recordings. OECTs have also been applied to a variety of electrochemical sensing approaches, typically by integrating a biorecognition element at the gate electrode. For example, OECT glucose sensors have been demonstrated in which glucose oxidase is immobilized on a gate electrode such that changes in glucose concentration modulate the source-drain current ($I_D$). Alternatively, gate voltage shifts have also been used to monitor analyte binding in transistor-based biosensors. All of these applications, however, employ direct current (DC) methods. This works well for systems that supply a continuous signal that is proportional to the analyte concentration (e.g., the current produced by enzyme-based sensors, the potentials produced on ion-selective membranes, etc.). However, an important, emerging class of biosensors instead relies on changes in charge transfer rate ($k_{CT}$), a signal transduction mechanism that is difficult to monitor effectively using DC methods.

Among biosensors that employ binding-induced changes in electron transfer kinetics, electrochemical aptamer-based (EAB) sensors are rapidly growing in importance due to their versatility and their exceptional selectivity. In these sensors, an aptamer (a DNA or RNA molecule selected in vitro to bind to a specific molecular target) is first reengineered such that target binding causes it to undergo a conformational change. The aptamer is then modified with a thiol linker for immobilization onto a gold electrode. The opposite end of the aptamer is attached to a redox reporter (typically methylene blue) to generate an electrochemical signal that is independent of any redox activity of the analyte. By altering the distance between the redox reporter and the underlying electrode, the aptamer's binding-induced conformational change modulates the rate of electron transfer to the electrode, which can be monitored using a variety of transfer-kinetics-sensitive electrochemical methods. AC voltammetry (ACV), for example, interrogates these sensors using a sinusoidal waveform with a frequency corresponding to the charge transfer rate of interest. The amplitude of the resulting current then depends on the average transfer rate of the redox reporter, thus reporting on the fraction of the aptamers that are target bound. Because it is even more sensitive to changes in transfer rate, however, square-wave voltammetry (SWV), is now the most commonly used approach to interrogate EAB sensors. This technique utilizes a square pulse superposed over a linearly sweeping voltage, with the pulse length being tuned to the frequency (transfer rate) of interest and the current being sampled only at the end of each pulse, rendering it particularly sensitive to transfer rates. EAB sensors using SWV interrogation have been shown to support continuous molecular monitoring in situ in the body, including in real-time monitoring of pharmacokinetics and metabolism in awake animals and closed-loop feedback control over plasma drug levels.

Due to the small currents produced by surface bound aptamers, an increasingly important limitation of traditional (electrode-based) EAB sensors is the difficulty of miniaturizing them below their current, few millimetre length scales. In response, earlier works have attempted to amplify EAB sensors via OECT-based platforms, but the existing DC transistor sensing methods are not particularly sensitive to changes in electron transfer kinetics, rendering them suboptimal for this application. Here, however, we adapt square-wave voltage operation at the gate electrode of an OECT to amplify the signals produced by EAB sensors. The resulting amplification is scalable, with two orders of magnitude improvement for planar 0.13 mm2 electrodes, suggesting that our approach will enable sensing at high spatial resolution in the mapping of molecular analyte concentrations.

By simultaneously transducing and amplifying, transistors offer advantages over simpler, electrode-based transducers in electrochemical biosensors. However, transistor-based biosensors typically use static (i.e., DC) operation modes that are poorly suited for sensor architectures relying on the modulation of charge transfer kinetics to signal analyte binding. Thus motivated, the present techniques translate the AC "pulsed potential" approach typically used with electrochemical aptamer-based sensor to an organic electrochemical transistor (OECT). Specifically, by applying a linearly sweeping square-wave potential to an aptamer-functionalized gate electrode, the present techniques produce current modulation across the transistor channel two orders of magnitude larger than seen for the equivalent, electrode-based biosensor. Critically, the resulting amplification is scalable, such that there is no signal loss with OECT miniaturization. The pulsed transistor operation demonstrated here could be applied generally to sensors relying on kinetics-based signaling, expanding opportunities for non-invasive and high spatial resolution biosensing.

FIG. 1A is a schematic diagram illustrating a biosensor 100 of the present techniques for small molecule detection in a fluid. The biosensor 100 comprises a reference-less organic electrochemical transistor, OECT, comprising a gate electrode 102 and a channel 104. The OECT also comprises a source electrode 106 and a drain electrode 108.

The biosensor 100 comprises a plurality of aptamers 110. In FIG. 1A, two aptamers 110 are shown, but it will be understood that the biosensor may have tens, hundreds, thousands or tens of thousands of aptamers 110 in the monolayer. Preferably, the plurality of aptamers are provided as a monolayer of aptamers. The monolayer is preferably formed of the same type of aptamer, i.e. aptamers for binding to a specific small molecule or specific family of small molecules. Each aptamer 110 is able to bind to a specific target small molecule 114. Each aptamer 110 has a first end that is immobilised on the gate electrode, and a second end functionalized with a redox reporter molecule 112. The binding of a target small molecule 114 to an aptamer 110 generates an electrochemical signal that in turn generates an amplified current through the channel 104 of the OECT that indicates detection of the target small molecule 114.

As shown in FIG. 1A, the aptamer 110 on the left-hand side is not bound to a target small molecule. Thus, the second end of the aptamer is far away from the gate electrode 102, as indicated by arrow 10. In contrast, the aptamer 110 on the right-hand side is bound to a target small molecule 114 and the binding has caused the shape or folding of the aptamer 110 to change. The second end of this aptamer 110 is closer to the gate electrode 110, as indicated by arrow 10'. Consequently, the rate of transfer of electrons between the redox reporter molecule 112 and the gate electrode 102 is faster/higher for the bound aptamer (right) relative to the rate of transfer of electrons for the unbound aptamer (left).

The aptamers 110 may be methylene-blue-modified aptamers.

The gate electrode 102 may comprise a metal. For example, the gate electrode 102 may comprise a functionalised gold layer.

The channel 104 may be formed of an organic mixed ionic-electronic conductor, such as PEDOT:PSS.

The gate electrode 102 and channel 104 may be designed so that their capacitances match, which allows for a voltage drop at both the channel and gate sides.

EAB sensors typically utilize a 3-electrode setup, in which a specific voltage (relative to a reference electrode) is applied to the aptamer-functionalized working electrode and the resulting Faradaic (redox-reaction-derived) current flowing to a separate counter electrode is measured. As noted, the transfer kinetics associated with this Faradaic current are typically measured using square wave voltammetry. In this technique, each square voltage pulse drives a current transient decay. By sampling the current at the end of the pulse (the length of which is defined by the square wave frequency), the measured current will be monotonically related to the charge transfer kinetics of the redox reporter. To optimize this strategy, the square-wave frequency is tuned to best distinguish between the transfer kinetics of the aptamer's bound and unbound states. The resulting current is correlated to the fraction of aptamers that are target bound, thus reporting on the concentration of the target.

As shown in FIG. 1A, the present OECT-EAB sensors are constructed such that the target-recognizing aptamers 110 are immobilized on the gate electrode 102. Rather than directly measuring the resulting Faradaic current at the gate, however, the present techniques use the current through the gate electrode 102 to modulate the conductivity in the OECT channel 104. Specifically, the current through the gate electrode 102 drives ions from the electrolyte (not shown) into and out of the conducting polymer channel 104, thereby modulating the charge carrier density (i.e., de-doping/doping). Thus, square-wave operation of OECTs is similar to square-wave operation of electrode-based sensors, but with an additional amplification step.

FIGS. 1B to 1E are graphs showing the operation of the biosensor. In adapting SWV to transistor-based sensors, a square-wave gate voltage ($V_G$) sweep is applied (FIG. 1B) that yields gate current ($I_G$) transients (FIG. 1C) caused by electron transfer to or from the methylene blue redox reporter 112. The OECT amplifies this gate current through the subsequent modulation in source-drain current ($I_D$, FIG. 1D), which is proportional to the integrated gate current:

$$\Delta I_D = \frac{Wd}{L}\mu \int I_G dt \qquad (1)$$

Here $\mu$ is the hole mobility and W, d, and L are the channel width, thickness, and length, respectively. The redox peak is constructed from the differences between $I_D$ sampled at times corresponding to the end of each $V_G$ pulse ($I_{for}-I_{rev}$, FIG. 1D), and the relative peak height reports on the analyte concentration (FIG. 1E).

The gate-to-channel modulation that drives OECT-EAB sensors can be represented by a simple circuit consisting of two capacitors in series, with $C_G$ representing the gate capacitance and $C_{CH}$ the channel capacitance. So as to maintain equilibrium across the circuit, the current flowing at the gate (in response to the redox reactions occurring on it) results in an equivalent charging of the channel ($Q_G=Q_{Ch}$). Such behavior is not usually captured in standard DC OECTs, which are instead designed to maximize voltage drop at the channel side ($C_G \gg C_{CH}$) so that the transconductance (i.e., voltage-to-current gain, $g_m$) is maximized. Instead, in the present techniques, the current gain ($\beta$) of the OECT is utilised to amplify the redox current at the gate.

$$\beta = \frac{\Delta I_D}{\Delta I_G} \qquad (2)$$

To optimize the signal transduced by the EAB-OECT, it is necessary to fine tune the gate-to-channel area ratio. The present applicant's analysis of various area ratios indicates that a ratio of ~80 is optimal (i.e., at this ratio $C_G=C_{CH}$). Lower ratios increase the voltage drop at the gate, increasing the driving force for Faradaic reactions but with lower overall gate currents. In contrast, higher ratios result in too low a voltage drop at the gate to drive the Faradaic reaction as well as increase the background signal from the charging of the electric double layer at the electrode surface, lowering the overall signal-to-noise ratio. Of note, both the device geometry and the drain voltage magnitude affect the redox peak position, which is effectively being referenced against the PEDOT:PSS channel 104.

FIG. 1B shows how a pulse square-wave superimposed over a voltage sweep is input as VG. This yields IG current decays from the oxidation of the methylene blue, as shown in FIG. 1C. The resulting ID is proportional to integrated IG, as shown in FIG. 1D. FIG. 1E shows how measuring the difference between each forward and reverse pulse current yields a distinct methylene blue redox peak. Upon target addition, the charge transfer rate increases, yielding a larger integrated current and leading to a higher ΔID redox peak.

Figure 2:
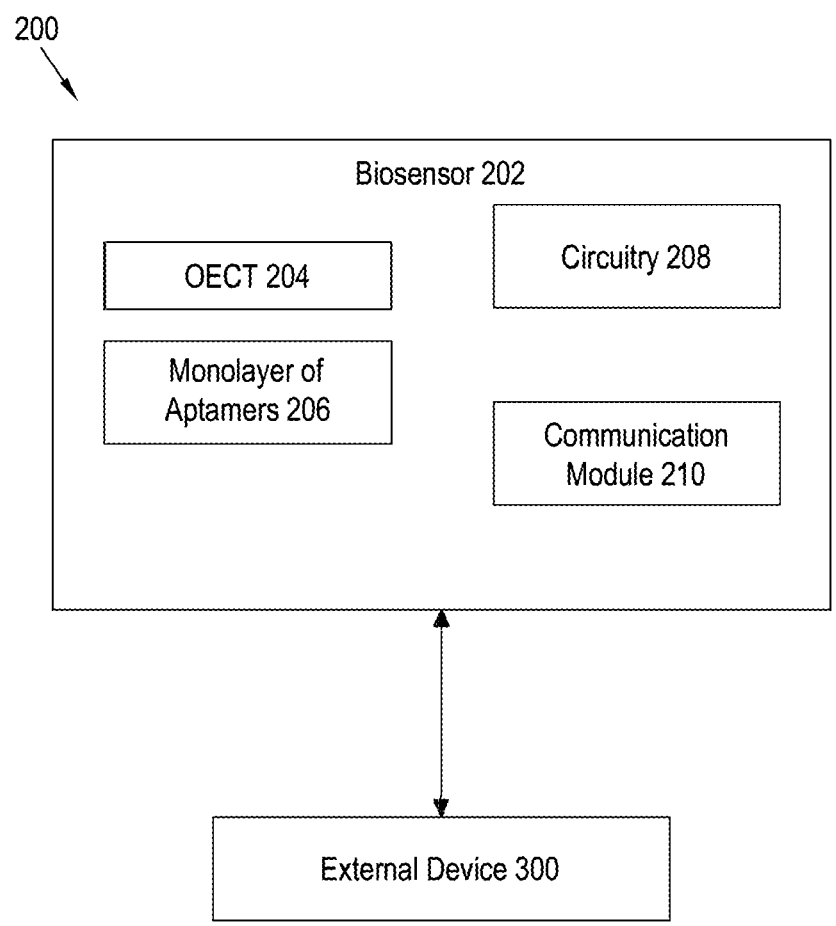
FIG. 2 is a block diagram of system comprising the biosensor.

FIG. 2 is a block diagram of system 200 comprising the biosensor. The system 200 comprises a biosensor 202 for small molecule detection in a fluid. The biosensor 202 comprises: a reference-less organic electrochemical transistor, OECT, 204 comprising a gate electrode and a channel (as shown in FIG. 1A). The biosensor 202 comprises a monolayer of aptamers 206, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule.

The biosensor 202 comprises electronic circuitry 208 for: applying a voltage pulse to the gate electrode and applying a voltage across the channel; and measuring a current through the channel to determine a proportion of the aptamers that are bound to target small molecules.

The biosensor 202 may further comprise a housing (not shown) for housing the OECT 204, the monolayer of aptamers 206, and the electronic circuitry 308. The housing may comprise a mechanism for receiving a fluid on the monolayer of aptamers 206. The mechanism may be an opening or aperture in the housing for receiving a fluid on the monolayer of the biosensor 202.

The biosensor 202 may be wearable or implantable, in which case, in use, the opening may be in contact with a bodily fluid of a user. Alternatively, the biosensor 202 may be an in vitro apparatus for receiving fluid samples taken from a human or animal.

The biosensor 202 may comprise a transmitter or communication module 210 for transmitting a value of the measured current to an external device 300. The transmitter 210 may use a wireless or wired communication mechanism. The wireless communication mechanism may be Bluetooth or Bluetooth Low Energy, for example.

The system 200 may comprise an external device 300. The external device 300 may be any suitable device for receiving the measurements made by the biosensor 302, such as a computer, smartphone, or other electronic computing device. The external device 300 may have a receiver for receiving the transmitted data from the biosensor 202.

As mentioned above, the electronic circuit 208 of the biosensor 202 applies a voltage pulse to the gate electrode of the OECT 204. The voltage pulse may be applied using any suitable technique. For example, an alternating voltage may be applied to the gate electrode.

A frequency of the voltage pulse applied to the gate electrode may be tuned to an electron transfer rate of the redox reporter molecule when an aptamer is bound to a target small molecule. This enables the proportion of aptamers bound to target small molecules to be determined.

A current through the channel of the OECT 204 may be measured at the end of each voltage pulse to determine a proportion of the aptamers that are bound to target small molecules. As noted above, a voltage may be applied to the channel continuously, but the resulting current through the channel may only be measured at the end of each pulse so that the changes in current that arise due to the change in electron transfer are measured. This enables the proportion of aptamers bound to target small molecules to be determined.

As mentioned above with reference to FIG. 1A, both the geometry of the OECT and the drain voltage magnitude affect the redox peak position, which is effectively being referenced against the channel of the OECT. Geometries of the gate electrode and channel may be balanced to drive a redox reaction between the redox reporter molecule and the gate electrode, to enable measurement of the change in electron transfer rate and to drive ions from the electrolyte into and out of the channel. The geometries of the gate electrode and channel may be balanced to match capacitance, such that voltage drops over both the gate and channel drive the redox reaction.

Figure 3A:
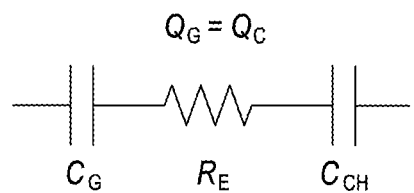
FIG. 3A is an equivalent circuit representing gate and channel capacitance.

FIG. 3A is an equivalent circuit represent gate and channel capacitance (CG and CCH, respectively) with electrolyte resistance (RE).

Figure 3B:
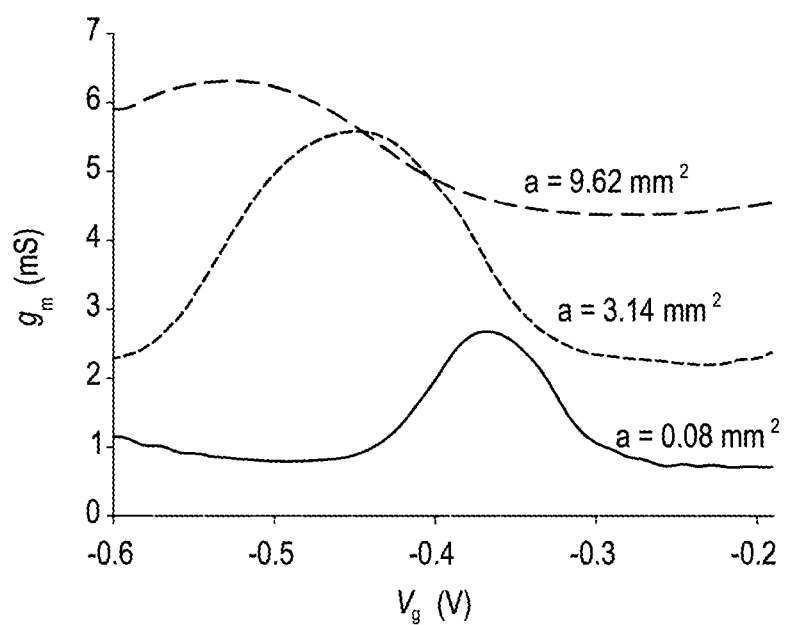
FIG. 3B is a graph showing DC transconductance for various gate electrode areas.

FIG. 3B is a graph showing DC transconductance for various gate electrode areas. Specifically, the graph shows DC transconductance for various gate electrode areas using the same channel area (W=50 µm, L=400 µm). The redox reporter peak shifts to lower voltages as gate area increases resulting in more voltage drop at the channel side. The capacitance of a representative electrode with a=3.14 mm2 is 10.6 µF with a corresponding channel capacitance of 33.4 µF, measured with an R-CPE circuit fit from electrochemical impedance spectroscopy.

As the testbed to compare the present OECT-based EAB sensors with the traditional, electrode-based EAB platform, the focus was on sensors employing an aptamer that binds the antibiotic tobramycin. In the absence of this drug, the redox reporter molecule (e.g. methylene blue) on the aptamer is held relatively far from the electrode surface, yielding a relatively slow charge transfer rate (i.e., small $k_{CT}$). Upon binding the drug, in contrast, the aptamer folds into a configuration that brings the redox reporter molecule closer to the electrode, increasing $k_{CT}$.

Figure 4A:
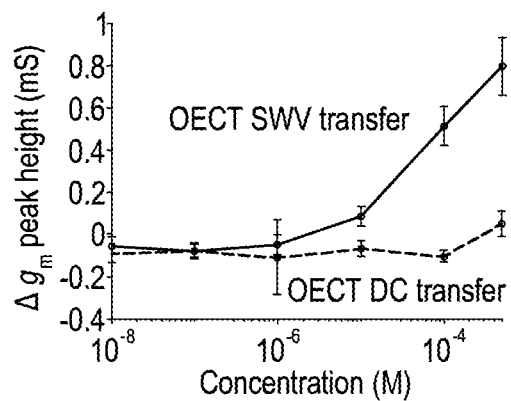
FIG. 4A is a graph showing the sensing behaviour of the biosensor using square-wave OECT operation.
Figure 4B:
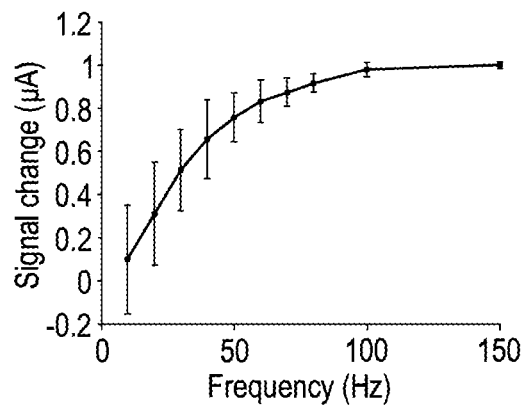
FIG. 4B is a graph showing signal gain upon tobramycin addition against frequency.
Figure 4C:
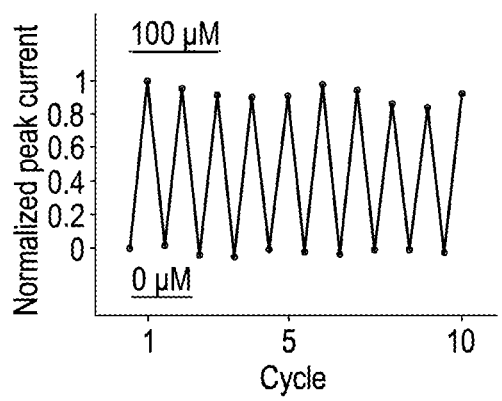
FIG. 4C is a graph of peak signal changes with spike and rinse cycles.
Figure 4D:
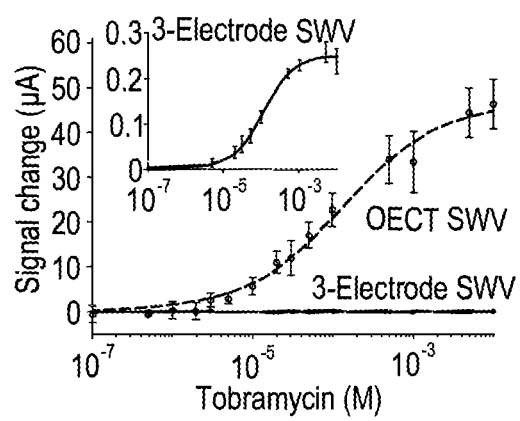
FIG. 4D is a graph showing binding curves of the OECT current and a 3-electrode square-wave voltammetry (SWV) current using the same gate and working electrode.

FIGS. 4A to 4D show graphs characterising the behaviour of the present biosensors. FIG. 4A is a graph showing the sensing behaviour of the biosensor using square-wave OECT operation. FIG. 4B is a graph showing signal gain upon tobramycin addition against frequency. FIG. 4C is a graph of peak signal changes with spike and rinse cycles. FIG. 4D is a graph showing binding curves of the OECT current and a 3-electrode square-wave voltammetry (SWV) current using the same gate and working electrode.

Of note, for the electrode-based system, it is possible to select square-wave frequencies at which the redox peak responds to rising target concentrations by either increasing ("signal-on behaviour," which is seen at square wave frequencies that preferentially signal the bound state; see FIG. 4A) or decreasing ("signal-off behaviour," preferentially signaling the unbound state). FIG. 4A shows EAB OECT sensing behaviour showing gm peak height growth with concentration using the square-wave OECT operation. The DC transfer curves do not respond to changes in analyte concentration.

In an OECT-based sensor, however, ID is proportional to the integral of the current transient, and thus the signal increases with increasing target concentration irrespective of the frequency employed. Specifically, it is empirically found that the maximum signal gain (i.e., maximum relative difference between the bound and unbound states) is reached at 70 Hz (FIG. 4B, which shows signal gain upon tobramycin addition versus frequency shows a maximum gain at approximately 70 Hz). This frequency dependence is consistent with a simple simulated model of the aptamer based OECT system using kCT and OECT governing equations obtained from previous literature.

The previously reported benefits of EAB sensors are maintained when the approach is adapted to the OECT platform. For example, the excellent reversibility of EAB sensors holds for their OECT implementation (FIG. 4C, which shows peak signal change with spike and rinse cycles, indicating good reversibility).

Similarly, both the electrode and OECT system exhibit Hill isotherm binding performance (FIG. 4D). FIG. 4D shows binding curves that show amplified signal from the OECT current versus 3-electrode SWV using the same gate and working electrode. Error bars correspond to replicate measurements on one device.

All data in FIGS. 4A to 4D were measured in 1× phosphate buffered saline (PBS) at ambient temperature. The OECT measurements used VD=−300 mV. FIGS. 4A-4C correspond to signal gain upon 500 µM tobramycin addition.

Figure 5A:
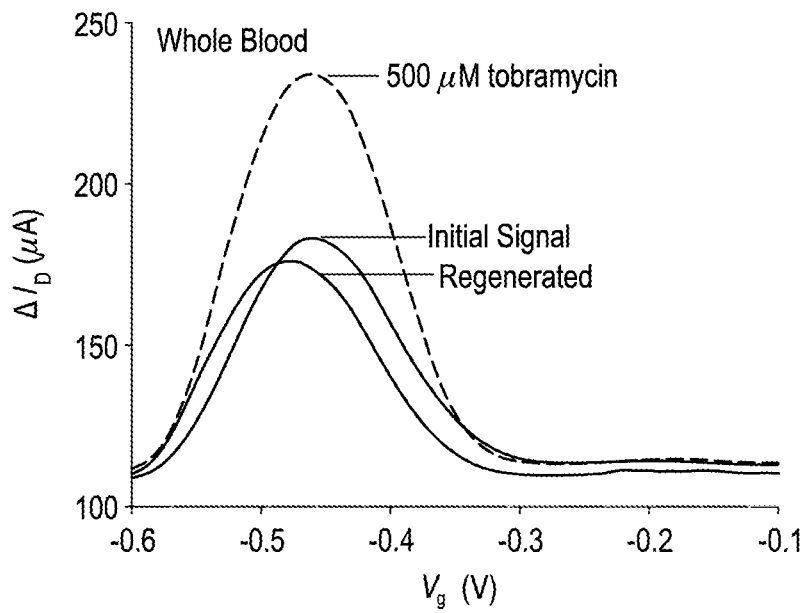
FIG. 5A is a graph showing that signal peaks and reversible sensing performance are maintained in whole blood.
Figure 5B:
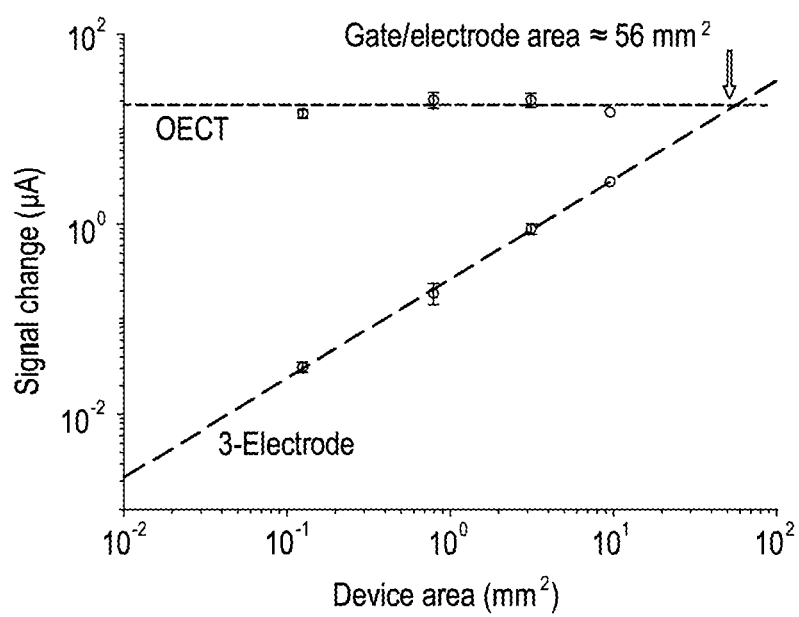
FIG. 5B is a graph showing how the OECT signal is maintained while the electrode current decreases linearly with area as both devices are miniaturised.

AB-OECT sensors are suitable for in vivo amplification. FIG. 5A is a graph showing that signal peaks and reversible sensing performance are maintained in whole blood. FIG. 5B is a graph showing how the OECT signal is maintained while the electrode current decreases linearly with area as both devices are miniaturised. Device area corresponds to both the working electrode and gate electrode areas and OECT measurements used VD=−100 mV.

The expected Langmuir Isotherm (i.e., saturable) binding has not been demonstrated with DC OECT operation of EAB sensors which may be more sensitive to pH and ionic concentration variation preventing signal saturation. Critically, the concentration-dependent peak height extracted by the AC OECT operation is specific to the electrochemical activity of the aptamer. Because of this aptamer-specific signal, it is suitable for application in complex in vivo environments where selectivity is paramount. To validate this selectivity, the present biosensor was challenged using defibrinated horse blood, where its response was quite similar to that seen in simple buffer systems (FIG. 5A).

A major advantage of applying OECTs in EAB sensors is the ability to maintain an amplified signal even upon substantial miniaturization. The issue is that, in a 3-electrode system, signal shrinks proportionally to reduced electrode area as the electrode accommodates fewer aptamers yielding less absolute current. And while IG is similarly reduced in smaller OECTs, due to its lower volume, a smaller channel requires proportionally less current to modulate a change in ID (Eqn. 1). That is, as the devices shrink, relative OECT amplification increases and, with this, the absolute signal is maintained. Given this, the OECT-based sensor should yield a higher signal than the traditional 3-electrode system for all electrodes below 33 mm2 (FIG. 5B). The present applicant believes this highly scalable amplification will allow for a range of sensing applications that were previously infeasible for EAB platforms. For example, miniaturization can enable more sensors per area, which will yield higher resolution spatial measurement.

Beyond the potential future applications of miniaturized EAB sensors, the presented pulsed VG technique can be applied generally to a wide range of transistor and biorecognition element pairings. For example, differential pulse voltammetry (DPV) uses a similar waveform to SWV and is used to reduce the effects of capacitive charging and to enable species differentiation by narrowing peaks. While the OECT was selected in this work for its high signal gain and good biocompatibility, the concept is not limited to OECTs; it will operate with the same attributes for any transistor biosensor that signals via a redox event with binding induced kCT changes at the gate electrode. By interrogating charge transfer kinetics in this way, pulsed operation will bring the advantages of transistor-derived amplification to a wide range of biosensor approaches.

Figure 6:
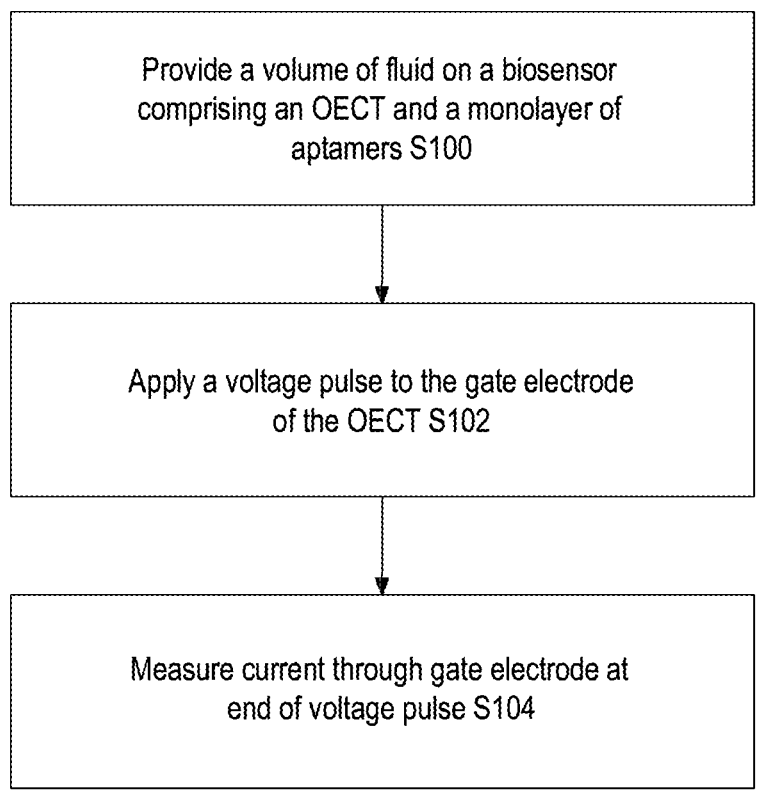
FIG. 6 is a flowchart of example steps for detecting target small molecules in a fluid.

FIG. 6 is a flowchart of example steps for detecting target small molecules in a fluid. The method comprises providing a volume of fluid on a biosensor comprising a reference-less organic electrochemical transistor, OECT, comprising a gate electrode and a channel, and a monolayer of aptamers, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule (step S100).

The method comprises applying a voltage pulse to the gate electrode of the OECT (step S102) and a (continuous) voltage across the channel of the OECT.

The method comprises measuring a current through the channel to determine a proportion of the aptamers that are bound to target small molecules (step S104).

Applying a voltage pulse may comprise applying a voltage pulse having a frequency that is tuned to an electron transfer rate of the redox reporter molecule when an aptamer is bound to a target small molecule.

The method may further comprise transmitting a value of the measured current to an external device, as explained above with reference to FIG. 2.

FIGS. 7A to 7E show steps to form the biosensor. The method of manufacturing the biosensor may comprise providing a substrate, and forming source, drain and gate electrodes and a channel of the OECT biosensor on the substrate (FIG. 7). The substrate may be any suitable substrate, such as a glass substrate, a polymer substrate, a flexible substrate, a flexible polymer substrate. The electrodes may be formed using a suitable patterning or deposition technique, such as lithography. More specifically, first, photolithography with a negative photoresist, AZ nLOF 2035 (Microchemicals GmbH), was used to outline the interconnects and source, drain, and gate electrodes on clean glass substrates. Next, 5 nm of titanium and 100 nm of gold were deposited (Kurt J Lesker PVD-75) after oxygen plasma (Diener Electronic Femto) activation. Gold liftoff was achieved by soaking overnight in NI555 stripper (Microchemicals GmbH).

Figure 7A:
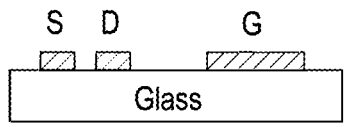
FIGS. 7A to 7E show steps to form the biosensor.
Figure 7B:
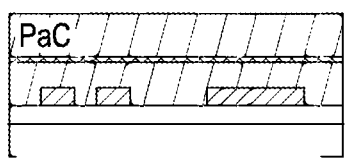

The method may comprise depositing two parylene-C layers with an anti-adhesive layer between the two layers to aid peel-off (FIG. 7B). More specifically, a silane treatment was used for adhesion to the first of two CVD deposited 2 μm parylene-C (PaC) layers (Specialty Coating Systems, Inc.). An anti-adhesive solution was spin-coated before the second PaC layer to enable peel-off.

Figure 7C:
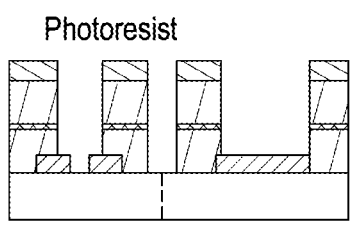

The method may comprise performing lithography on the parylene-C layers to expose the channel and gate areas of the OECT, and then the substrate may be diced/divided to separate the gate electrode and channel (FIG. 7C, where the dashed line indicates the dividing).

The method may comprise depositing a material which forms the channel of the OECT. In this example, PEDOT:PSS is spin-coated over the channel (FIG. 7D).

Figure 7D:
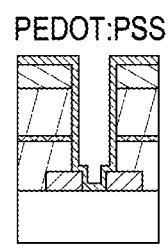

Specifically, for the steps in FIGS. 7C and 7D, to expose the contact and channel areas, a second photolithography step was completed with a positive photoresist, AZ 10XT (Microchemicals GmbH) and samples were etched with a reactive ion etcher (Oxford 80 Plasmalab plus). The OECT gates and channels were separated by dicing to enable separation for PEDOT:PSS spin-coating. Ethylene glycol (5% v/v) and 4-dodecylbenzenesulfonic acid (DBSA, 0.25% v/v) were sonicated with PEDOT:PSS. Next, 1% (v/v) of (3-glycidyloxypropyl)trimethoxysilane (GOPS) was added and the solution passed through 0.45 μm polytetrafluoroethylene filters. Following another oxygen plasma treatment, two layers of the PEDOT:PSS mixture were spin-coated on the channels for 30 seconds at 3000 RPM. The sacrificial PaC layer was peeled off and the samples were hard-baked to cross link the PEDOT:PSS. Finally, the samples were soaked in DI water overnight and preconditioned to maximize stability.

Figure 7E:
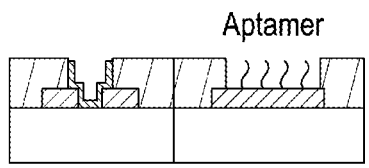

The method may comprise immobilising at least one aptamer on the gate electrode of the transistor (FIG. 7E). Each aptamer has a first end that is immobilised on the gate electrode, and a second end for binding with a target small molecule, the binding generating an electrochemical signal indicating detection of the target small molecule. The gate electrode and channel are reconnected with a well for testing. Specifically, the aminoglycoside aptamer (5'-HO—(CH$_2$)$_6$—S—S—(CH$_2$)$_6$-GGGACTTGGTTTAGGTAAT-GAGTCCC—O—CH$_2$—CHCH$_2$OH—(CH$_2$)$_4$—NH—CO—(CH$_2$)$_2$-methylene blue-3') was purchased from Sangon Biotech and used as supplied. A 2 μL aliquot of 100 μM aptamer in PBS was thawed and mixed with 4 μL of 10 mM tris(2-carboxyethyl)phosphine (TCEP, Sigma-Aldrich) for 8 hours to reduce the disulfide bond. Next, the aptamer solution was diluted to 500 nM with PBS and placed in a polydimethylsiloxane (PDMS) well over plasma activated gate (working) electrodes for an overnight immobilization. Next, electrodes were rinsed and placed in a 10 mM 6-mercapto-1-hexanol (6-MCH, Sigma-Aldrich) for 5 hours to passivate. Finally, electrodes were rinsed with PBS and connected to channels via a PDMS well.

The OECT measurements described above with reference to FIGS. 1B to 5B were collected using a Keysight B1500A semiconductor device analyzer. All OECT measurements used a $V_G$ sweeping from −600 mV to −100 mV. Electrode measurements were carried out on an Autolab potentiostat (Metrohm) using the gate electrode as working electrode with Ag/AgCl reference and platinum counter electrodes. For square-wave measurements on both the OECT and electrode, a 5 mV step and 20 mV amplitude were used. Unless otherwise noted, OECT SWV measurements used a frequency of 70 Hz and electrode SWV measurements used 240 Hz. Sensing performance was measured by adding graduated amounts of stock tobramycin (ThermoFisher).

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A biosensor for small molecule detection in a fluid, the biosensor comprising:
    a reference-less organic electrochemical transistor, OECT, comprising a gate electrode and a channel;
    a monolayer of aptamers, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule; and
    electronic circuitry for:
        applying a voltage pulse to the gate electrode and applying a voltage across the channel, and
        measuring a current through the channel to determine a proportion of the aptamers that are bound to target small molecules;
    wherein the biosensor is configured for binding of the target small molecule to the aptamer causing a change in electron transfer rate to or from the gate electrode, the OECT is configured to amplify the current through the channel amperometrically by modulating a source-drain current through a Faradaic current at the gate electrode, the fluid functions as an electrolyte, and the current through the gate electrode drives ions from the electrolyte into and out of the channel of the transistor; and
    wherein geometries of the gate electrode and channel are balanced to drive a redox reaction between the redox reporter molecule and the gate electrode, to enable measurement of the change in electron transfer rate and to drive ions from the electrolyte into and out of the channel, and the geometries of the gate electrode and channel are balanced to match capacitance, such that voltage drops over both the gate and channel drive the redox reaction.

2. The biosensor as claimed in claim 1 wherein the electronic circuit applies an alternating voltage to the gate electrode.

3. The biosensor as claimed in claim 1 wherein a frequency of the voltage pulse applied to the gate electrode is tuned to an electron transfer rate of the redox reporter molecule when an aptamer is bound to a target small molecule.

4. The biosensor as claimed in claim 3 wherein the electronic circuit is further configured for measuring a current through the channel of the OECT at the end of each voltage pulse to determine a proportion of the aptamers that are bound to target small molecules.

5. The biosensor as claimed in claim 1 wherein the gate electrode comprises a metal.

6. The biosensor as claimed in claim 1 wherein the channel is formed of an organic mixed ionic-electronic conductor.

7. The biosensor as claimed in claim 1 further comprising a flexible substrate, and wherein the OECT and monolayer of aptamers are provided on the flexible substrate.

8. The biosensor as claimed in claim 1 wherein the biosensor is wearable or implantable.

9. The biosensor as claimed in claim 8 wherein the biosensor provides real-time monitoring of the target small molecule.

10. The biosensor as claimed in claim 1 further comprising a housing for housing the OECT, the monolayer of aptamers, and the electronic circuitry, the housing comprising a mechanism for receiving a fluid on the monolayer of aptamers.

11. The biosensor as claimed in claim 10 wherein the mechanism is an opening in the housing for receiving a fluid on the monolayer of the biosensor.

12. The biosensor as claimed in claim 11 wherein the biosensor is wearable or implantable, and wherein, in use, the opening is in contact with a bodily fluid of a user.

13. The biosensor as claimed in claim 1 further comprising a transmitter for transmitting a value of the measured current to an external device.

14. A method for detecting target small molecules in a fluid, the method comprising:
    providing a volume of fluid on a biosensor comprising a reference-less organic electrochemical transistor, OECT, comprising a gate electrode and a channel, and a monolayer of aptamers, each aptamer for binding with a target small molecule and having a first end that is immobilised on the gate electrode, and a second end functionalized with a redox reporter molecule, the binding of a target small molecule to an aptamer generating an electrochemical signal that in turn generates an amplified current through the channel of the OECT that indicates detection of the target small molecule;
    applying a voltage pulse to the gate electrode of the OECT and applying a voltage across the channel, wherein a frequency of the voltage pulse applied to the gate electrode is tuned to an electron transfer rate of the redox reporter molecule when an aptamer is bound to a target small molecule; and
    measuring a current through the channel to determine a proportion of the aptamers that are bound to target small molecules.

15. The method as claimed in claim 14 wherein an alternating voltage is applied to the gate electrode.

16. The method as claimed in claim 14 wherein a current through the channel of the OECT is measured at the end of each voltage pulse to determine a proportion of the aptamers that are bound to target small molecules.

* * * * *